(12) United States Patent
Rawlinson et al.

(10) Patent No.: US 9,386,335 B2
(45) Date of Patent: Jul. 5, 2016

(54) VEHICLE DISPLAY WITH AUTOMATIC POSITIONING SYSTEM

(71) Applicant: Atieva, Inc., Redwood City, CA (US)

(72) Inventors: Peter Dore Rawlinson, Worcestershire (GB); Eric Obers, Rutesheim (DE)

(73) Assignee: ATIEVA, INC., Menlo Park, CA (US)

( * ) Notice: Subject to any disclaimer, the term of this patent is extended or adjusted under 35 U.S.C. 154(b) by 317 days.

(21) Appl. No.: 14/083,572

(22) Filed: Nov. 19, 2013

(65) Prior Publication Data
US 2015/0138044 A1 May 21, 2015

(51) Int. Cl.
| | |
|---|---|
| *B60R 11/00* | (2006.01) |
| *B60R 11/02* | (2006.01) |
| *H04N 21/414* | (2011.01) |
| *G06F 3/14* | (2006.01) |
| *B60N 2/00* | (2006.01) |
| *H04N 21/422* | (2011.01) |
| *G09G 3/20* | (2006.01) |
| *B60N 2/02* | (2006.01) |
| *G06F 3/0484* | (2013.01) |
| *H04N 5/655* | (2006.01) |

(52) U.S. Cl.
CPC .......... *H04N 21/41422* (2013.01); *B60N 2/002* (2013.01); *B60R 11/0235* (2013.01); *G06F 3/1454* (2013.01); *G09G 3/20* (2013.01); *H04N 21/42201* (2013.01); *B60K 2350/00* (2013.01); *B60K 2350/405* (2013.01); *B60K 2350/903* (2013.01); *B60K 2350/922* (2013.01); *B60N 2002/0272* (2013.01); *B60R 2011/008* (2013.01); *B60R 2011/0028* (2013.01); *G06F 3/0484* (2013.01); *G09G 2354/00* (2013.01); *G09G 2380/10* (2013.01); *H04N 5/655* (2013.01)

(58) Field of Classification Search
CPC ...................... B60R 11/0235; H04N 21/41422
USPC ............................................... 348/148
See application file for complete search history.

(56) References Cited

U.S. PATENT DOCUMENTS

| | | | | |
|---|---|---|---|---|
| 5,118,134 | A * | 6/1992 | Mattes | G01P 3/68 180/268 |
| 2002/0003571 | A1* | 1/2002 | Schofield | B60C 23/00 348/148 |
| 2003/0202005 | A1* | 10/2003 | Sadahiro | H04M 1/6091 715/716 |
| 2004/0026947 | A1 | 2/2004 | Kitano et al. | |
| 2004/0036769 | A1* | 2/2004 | Sadahiro | B60R 11/0235 348/148 |
| 2005/0192727 | A1 | 9/2005 | Shostak et al. | |
| 2006/0061008 | A1* | 3/2006 | Karner | B29C 45/0017 264/250 |
| 2006/0262189 | A1* | 11/2006 | Boundy | B60R 11/0235 348/148 |
| 2007/0229238 | A1* | 10/2007 | Boyles | G06K 9/00369 340/435 |

(Continued)

FOREIGN PATENT DOCUMENTS

| | | |
|---|---|---|
| JP | 2001254444 | 10/1989 |
| JP | 2001218131 | 2/2000 |

(Continued)

*Primary Examiner* — Peter Macchiarolo
*Assistant Examiner* — Anthony W Megna Fuentes
(74) *Attorney, Agent, or Firm* — Patent Law Office of David G. Beck

(57) ABSTRACT

A display system mounted within a vehicle is provided, where the system monitors the user's position within the vehicle's seat and automatically adjusts the location of the display to compensate for variations in the size or seating position of the user, thereby helping to alleviate the eye strain, fatigue, neck and back pain that often accompany the improper use of a monitor for an extended period of time.

45 Claims, 14 Drawing Sheets

(56) References Cited

U.S. PATENT DOCUMENTS

2010/0001994 A1* 1/2010 Kim .................. G01B 21/16 345/419
2011/0227717 A1* 9/2011 Kumon ................ G02B 27/01 340/441
2013/0218412 A1 8/2013 Ricci

FOREIGN PATENT DOCUMENTS

| JP | 2002234399 | | 2/2001 |
| JP | 2007022494 | | 7/2005 |
| JP | 2007038859 | | 8/2005 |
| JP | 2006146254 | | 6/2006 |
| JP | 2006146254 A | * | 6/2006 |
| JP | 2011020538 | | 7/2009 |

* cited by examiner

VEHICLE DISPLAY WITH AUTOMATIC POSITIONING SYSTEM

FIELD OF THE INVENTION

The present invention relates generally to a display system for use in a vehicle and, more particularly, to a system that automatically adjusts and optimizes the position of the display.

BACKGROUND OF THE INVENTION

The use of a laptop computer no longer requires that the user compromise on processor speed, display size, display resolution or memory. Additionally, given the battery life available in many such computers, the user is no longer required to limit their use to small working sessions. As a result, laptops have become a viable alternative for many professionals, offering the end user both the performance that they have come to expect from a desktop computer as well as the portability and convenience associated with a laptop. Unfortunately while the performance of laptop computers have improved dramatically over the last decade, their usefulness is still limited due to the setting in which they are often used. For example, on an airplane if the user does not wish to rest their computer on their lap, then they must sit their laptop on the tray table that is either linked to the back of the seat in front of their own, or linked to the arm-rest of their own chair. In a car the user's options are even more limited, in general requiring that the user either rest their computer directly on their lap or on a lap tray. Unfortunately, none of these approaches provide the user with a reasonable ergonomic solution, either in terms of display or keyboard position. Accordingly, what is needed is a system that allows a person to comfortably and ergonomically use a display while riding in a vehicle. The present invention provides such a system.

SUMMARY OF THE INVENTION

The present invention provides a display system that includes (i) a display mounted within and to a vehicle, where the display may be adjusted within a range of display positions, (ii) a display positioning system coupled to the display, (iii) a vehicle seat mounted within the vehicle and positioned to allow an occupant of the vehicle seat to utilize the display, (iv) an occupant position sensor system that outputs occupant position data corresponding to a current position of the occupant within the vehicle seat, and (v) a control system coupled to the display positioning system and to the occupant position sensor system, where the control system monitors the sensor system to determine the occupant's current position within the vehicle seat and adjusts the display's position in response to the occupant's current position. The control system may use a look-up table stored in memory, where the look-up table includes a plurality of compatible display positions that correspond to the plurality of occupant positions within the vehicle seat, and where each of the compatible display positions may be set to maintain (i) a display viewing distance within a preset range, (ii) a display vertical tilt angle relative to the occupant within a preset range, (iii) a display horizontal tilt angle relative to the occupant within a preset range, and/or (iv) a display horizontal tilt angle relative to a horizontal vehicle axis within a preset range. The occupant position sensor may be comprised of a plurality of pressure sensors integrated into the vehicle seat; alternately, comprised of an electromagnetic or ultrasonic transducer. The display positioning system may utilize an electro-mechanical positioning system or a hydraulic positioning system. The linkage assembly that mounts the display to the vehicle and which is used by the positioning system and the controller to adjust the display's position may include (i) a guide track mounted to the vehicle, where an arm of the linkage assembly slides within the guide track, (ii) a telescoping link, (iii) a telescoping link where a portion of the telescoping link slides within a guide track mounted to the vehicle and/or (iii) a multi-link assembly that includes a first link pivotably coupled to the display and to a second link, and a second link pivotably coupled to the first link and the vehicle.

In another aspect of the invention, the system may further comprise a vehicle seat sensor that outputs seat position data corresponding to the seat's current position, and where the control system monitors the seat position data and adjusts the current display position in response to the current seat position. The control system may use a look-up table stored in memory in order to adjust the display to the current display position, where the look-up table includes a plurality of compatible display positions that correspond to the plurality of occupant positions within the vehicle seat and to a range of seat positions corresponding to the vehicle seat.

A further understanding of the nature and advantages of the present invention may be realized by reference to the remaining portions of the specification and the drawings.

DESCRIPTION OF THE SPECIFIC EMBODIMENTS

The present invention provides a system that monitors user position within a vehicle seat and, in at least one embodiment, the position of the seat as well, and uses this information to automatically position a vehicle display in order to help alleviate the eye strain, fatigue, neck and back pain that often accompany the improper use of a monitor for an extended period of time. While the primary application is an automobile, the inventors envision that the invention may be integrated equally well into an airplane, train, bus or other vehicle.

Figure 1:
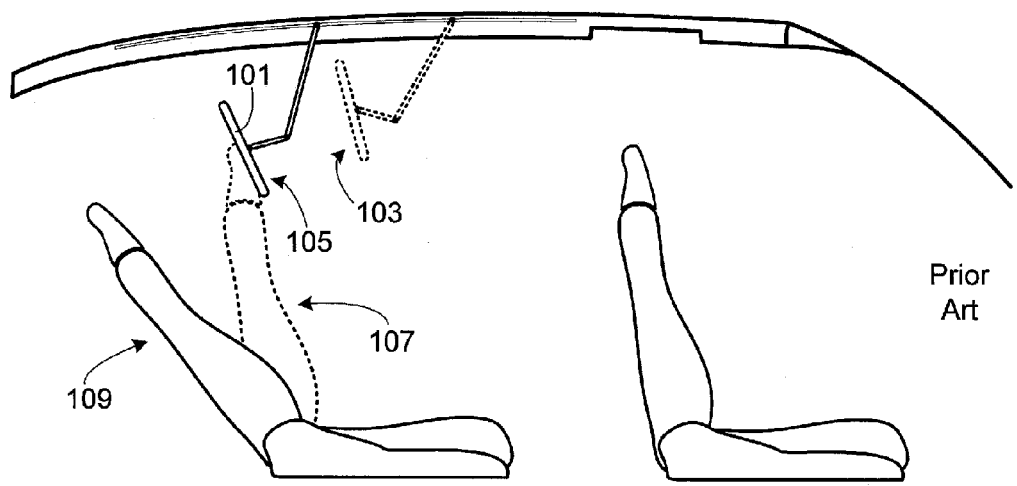
FIG. 1 provides a side view of a synchronized display in accordance with the prior art, this view illustrating the display being repositioned as the seat is reclined.
Figure 2:
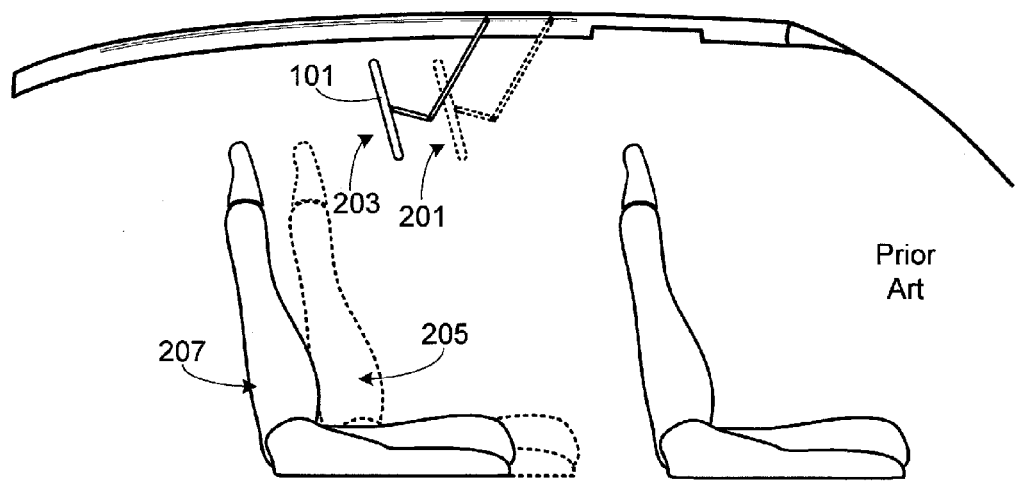
FIG. 2 provides a side view of a synchronized display in accordance with the prior art, this view illustrating the display being repositioned as the seat is moved backwards.
Figure 3:
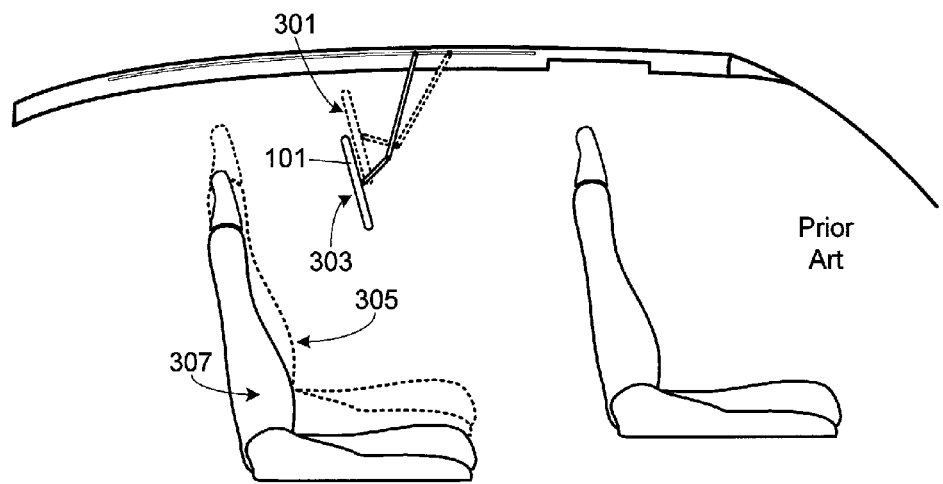
FIG. 3 provides a side view of a synchronized display in accordance with the prior art, this view illustrating the display being repositioned as the seat is lowered.

Co-assigned U.S. patent application Ser. No. 14/082,241, filed 18 Nov. 2013 and incorporated herein by reference, discloses a vehicular-mounted display system that automatically compensates for changes in the position of the user's seat. Utilizing any of a variety of different display linkage and guide track configurations, the disclosed system is able to reposition a vehicle's internally-mounted display as the position of the user's seat changes in degree of recline, forward-backward position, or downward-upward position. For example and as illustrated in FIG. 1, display 101 is repositioned from a first position 103 (shown in phantom) to a second position 105 as the vehicle's seat reclines from a first position 107 (shown in phantom) to a second position 109. Similarly, in FIG. 2 display 101 is repositioned from a first position 201 (shown in phantom) to a second position 203 as the seat moves backward from a first position 205 (shown in phantom) to a second position 207, while in FIG. 3 display 101 is repositioned from a first position 301 (shown in phantom) to a second position 303 as the seat moves downward from a first position 305 (shown in phantom) to a second position 307.

While the prior art system is able to provide the user with an improved display viewing experience by monitoring seat position and adjusting the vehicle's display accordingly, it does not take into account variations between users, nor does it accommodate the user changing positions within their seat. As a result, while an average sized person sitting upright and centered in their chair may enjoy their view of display 101, a shorter than average or a taller than average person, or a person sitting to one side, or a person slumped down in their chair may have a difficult time using display 101, especially if display 101 has poor off-axis viewing characteristics. Accordingly, the present invention monitors the user's position within their seat and uses this information to optimize the position of display 101.

Figure 4:
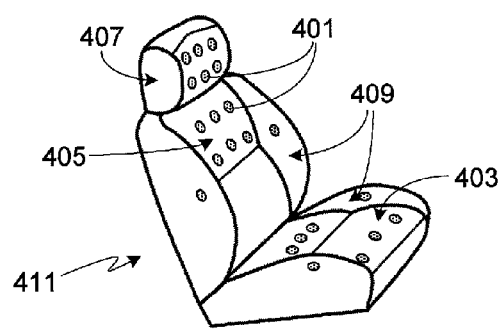
FIG. 4 illustrates the use of pressure sensors within the vehicle seat as a means of determining the user's location within the seat.

The present invention may be configured to utilize any of a variety of different types of sensors, alone or in combination, to determine the location of a user within their seat, thus taking into account both user height and location within their chair. For example, FIG. 4 illustrates the inclusion of a plurality of pressure sensors 401 incorporated into the seat 403, back 405, headrest 407 and side bolsters 409 of vehicle seat 411. Although sensors 401 are clearly visible in FIG. 4, it should be understood that in a typical configuration, and as is well known by those of skill in the art, sensors 401 are located underneath the seat's upholstery, thus making them invisible to someone sitting in seat 411.

The number of sensors 401, as well as their positions within seat 411, is selected to provide the desired level of sensitivity to user positioning. In general, the sensors 401 located in the seat back 405 and the headrest 407 indicate the height, and thus the eye-level, of the user. The sensors 401 located within the bolsters 409 can be used to determine whether the user is sitting off-center, for example leaning to one side or the other side of seat 411. Additionally, when the headrest 407, seat back 405 and seat 403 include rows of multiple sensors across the seat's width, as illustrated in the exemplary configuration shown in FIG. 4, by monitoring the weight distribution in each row of sensors the system is able to detect whether the user is seated off-center and if so, where the user is seated.

It should be understood that the present invention is not limited to a single technique, such as the pressure sensors described above, for monitoring and determining the user's location within the vehicle's seat. For example, a variety of different electromagnetic and ultrasonic transducers may be used to determine where the viewer is positioned within the seat. These transducers, which may emit a continuous signal, a time varying signal or a spatially varying signal, monitor the reflected signal to determine the location of the person sitting in the vehicle seat. The invention may use separate transmitter and receiver transducers or, as preferred, transceiver transducers that are capable of both transmitting and receiving the monitor signal.

Figure 5:
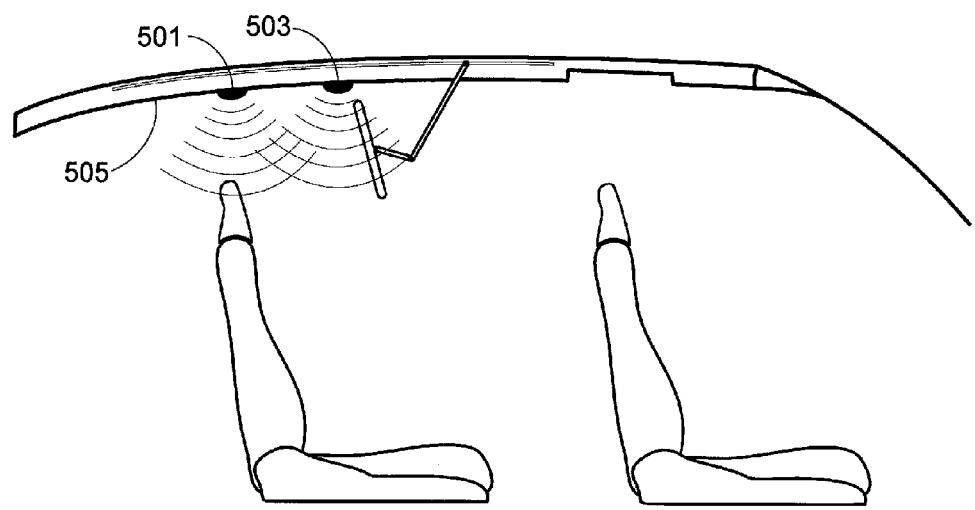
FIG. 5 illustrates the use of transducers, mounted in the vehicle's headliner, as a means of determining the user's location within the seat.
Figure 6:
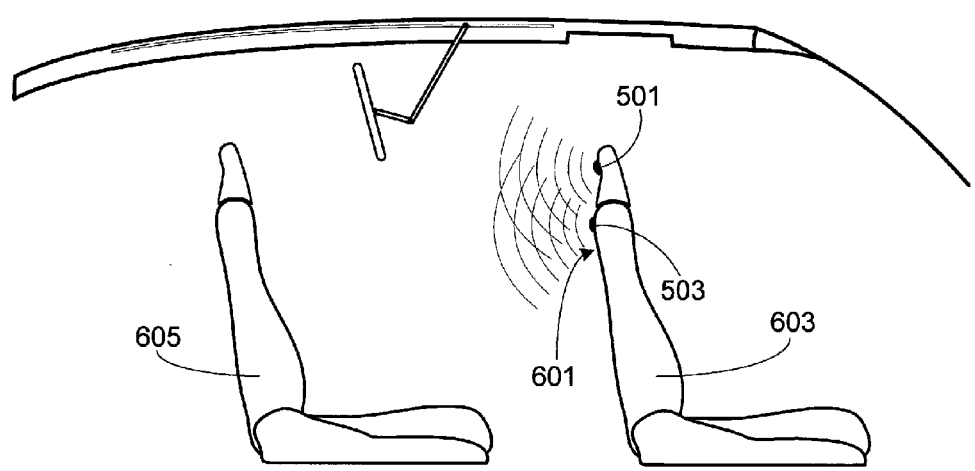
FIG. 6 illustrates the use of transducers, mounted in the back of an adjacent seat, as a means of determining the user's location.
Figure 7:
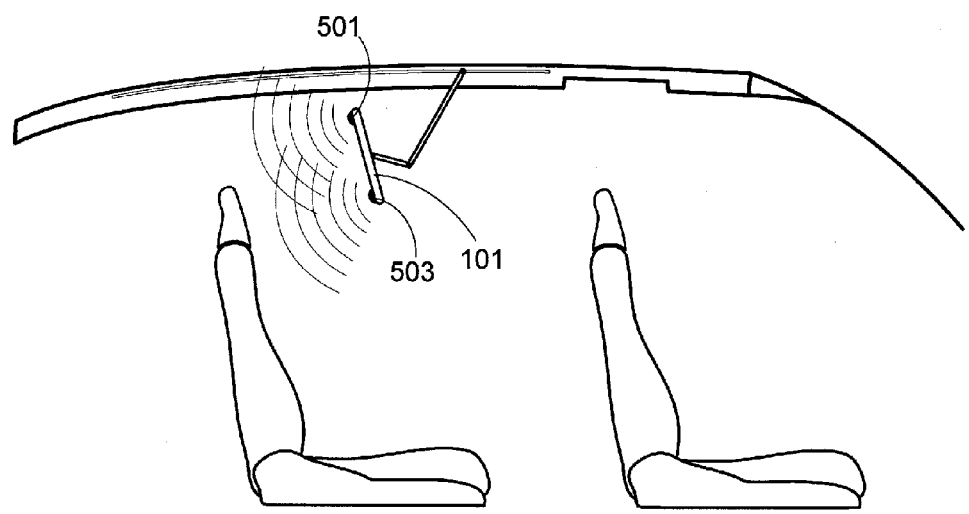
FIG. 7 illustrates the use of transducers, mounted in the display, as a means of determining the user's location within the seat.

FIGS. 5-7 illustrate three exemplary configurations that utilize a transducer-based detection system. It should be understood that while two transducers are shown in each of the exemplary embodiments, the invention may use a single transducer or more than two transducers. Similarly, while the exemplary transducers are transceivers, as previously noted separate transmitter and receiver transducers may be used. Additionally, the invention may utilize other transducer mounting locations as well as various transducer location combinations. Lastly, the invention may use multiple detection schemes, for example transducers for determining viewing height and pressure sensors within the seat to determine the user's location relative to the seat's centerline. In FIG. 5 transducers 501 and 503 are mounted to, or within, the vehicle's headliner 505, these transducers providing the desired user location information to the system controller. In FIG. 6 transducers 501 and 503 are mounted to, or within, the seat back 601 of seat 603, where seat 603 is the seat in front of the display user's seat 605. In FIG. 7 transducers 501 and 503 are mounted to display 101, for example above and below the display a shown.

Figure 8:
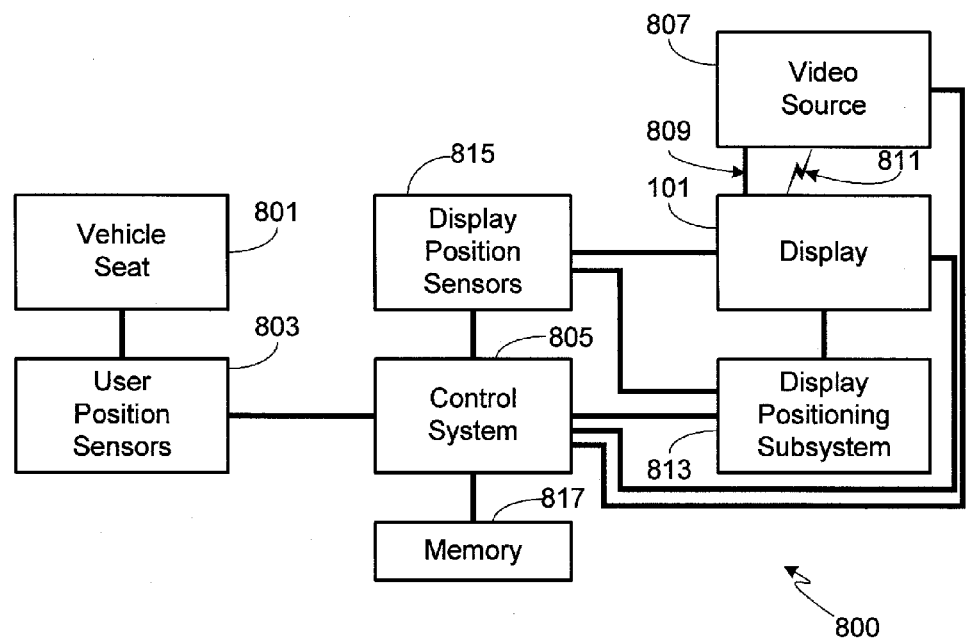
FIG. 8 provides a block diagram of the primary subsystems associated with the invention.

FIG. 8 illustrates the primary components associated with a preferred embodiment of the invention. The system includes a seat 801 in which the user of the display 101 sits. Associated with seat 801 are one or more user position sensors 803 that are capable of determining the location and position of the user seated within vehicle seat 801. Sensors 801 may be comprised of pressure sensors such as those described above and illustrated in FIG. 4, or transducers such as those described above and illustrated in FIGS. 5-7, or some combination thereof. User position information as determined by sensors 803 is provided to control system 805, also referred to herein simply as a controller. Control system 805, which includes a control processor, may be a dedicated control system or integrated into another vehicle control system, for example a vehicle management system.

The flat panel display 101 of system 800 can utilize any of a variety of display technologies (e.g., light-emitting diode (LED), plasma, organic light-emitting diode (OLED), liquid crystal (LCD), thin film transistor LCD (TFT-LCD), field emission display (FED) or other technology). Display 101 may be intended solely for display purposes, i.e., a monitor, or display 101 may be a touch-screen that allows direct user interaction, for example by incorporating capacitive touch technology into the display. Display 101 is coupled to a video source 807 (e.g., a computer, DVD player, etc.). Video source 807 may be hard-wired to the display via cabling 809, or coupled via a wireless system 811 using any of a variety of wireless communication protocols (e.g., IEEE 802.11, long term evolution (LTE), Wi-Fi, Bluetooth, WiGig, WirelessHD, etc.).

Coupled to display 101 is a display position controller 813 that may utilize an electro-mechanical (e.g., motorized) positioner, a hydraulic positioner or other positioning system to adjust and control the viewing position of display 101. As described in detail below, display positioning system 813 is used by the system controller 805 to vary the position of display 101 in response to either the user changing positions (e.g., leaning to one side, slouching down in the seat, etc.) or to a change in the size of the user (e.g., changing from a tall user to a short user). Sensors 815 are used to insure proper placement of display 101 and as such, may either directly monitor display position or may determine display position by monitoring display positioning system 813. In a preferred embodiment, sensors 815 and positioning system 813 are combined into a single system.

In the preferred embodiment, a memory 817 is coupled to system controller 805. Memory 817 may be a stand-alone memory or integrated into controller 805. Memory 817 may be comprised of flash memory, a solid state disk drive, a hard disk drive, or any other memory type or combination of memory types. Stored within memory 817 is a set of control instructions which, in at least one embodiment, includes a look-up table that provides a particular display location, also referred to herein as a compatible display position, for seat occupants of varying size and sitting in different regions within vehicle seat 801. As described in further detail below, preferably each preset display position stored in memory maintains at least one of (i) a display viewing distance within a preset range, (ii) a display vertical tilt angle relative to the occupant within a preset range, (iii) a display horizontal tilt angle relative to the occupant within a preset range, and/or (iv) a display horizontal tilt angle relative to a horizontal vehicle axis within a preset range. Accordingly, when adjusting the display in response to a change in user or user seating position, preferably controller 805 uses the look-up table to determine the compatible display position for the current seat position.

Figure 9:
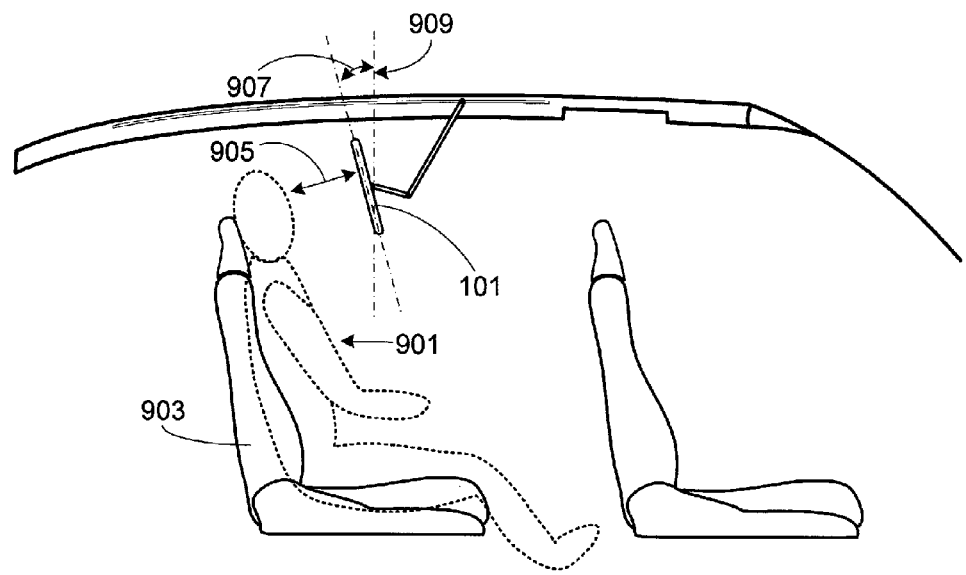
FIG. 9 illustrates a deployed display configured for a tall system user.
Figure 10:
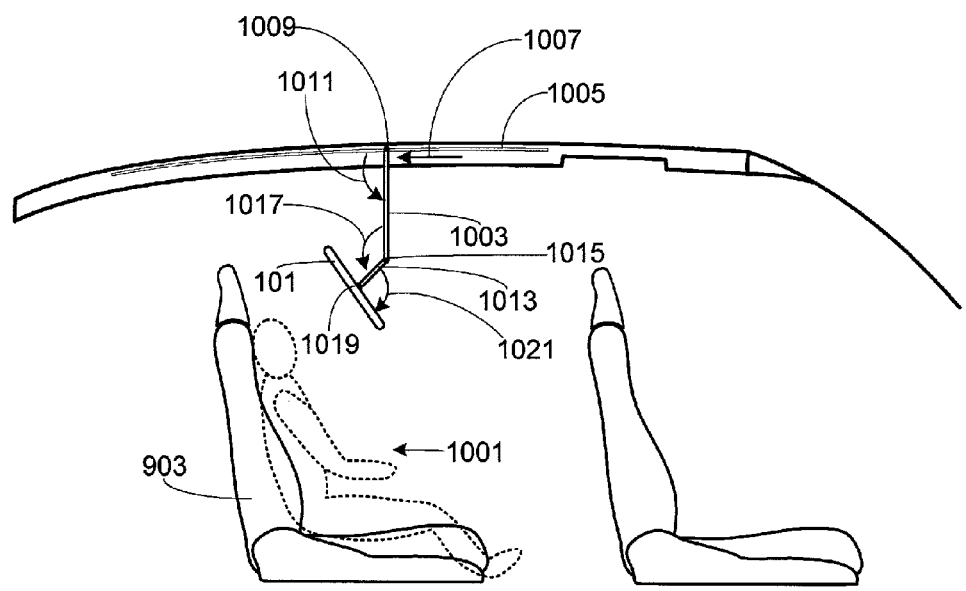
FIG. 10 illustrates the display system shown in FIG. 9, automatically reconfigured to accommodate a short system user.

FIGS. 9 and 10 illustrate the operation of the present invention to accommodate users of different size. In FIG. 9, a tall person 901 is shown, in phantom, seated in vehicle seat 903. After detecting the size and seating position of the occupant using sensors 803, controller 805 automatically moves display 101 to achieve the desired viewing distance 905. Preferably system controller 805 also varies the tilt angle 907 of the display relative to vertical axis 909, referred to herein as the display's vertical tilt angle, in order to provide the user with the desired level of display tilt relative to their head placement. If system controller 805 detects a shorter person 1001 in seat 903 using sensors 803, for example a child sitting in the vehicle's seat, then it automatically repositions display 101 to accommodate the different user's viewing characteristics. For example using the linkage assembly shown in FIGS. 9 and 10, system controller 805 optimizes the position of the display for the shorter user by moving arm 1003 within guide track 1005 in a direction 1007, pivoting arm 1003 about axis 1009 in a direction 1011, pivoting arm 1013 about axis 1015 in a direction 1017, and pivoting display 101 about axis 1019 in a direction 1021. These linkage adjustments alter the height of the display above seat 903, and more particularly correct the display's position (e.g., viewing distance and vertical tilt angle) to match the new viewing position corresponding to the shorter person. Although some embodiments of the invention only adjust display height, and thus viewing distance, preferably the system is configured to also adjust the vertical tilt angle as illustrated.

Figure 11:
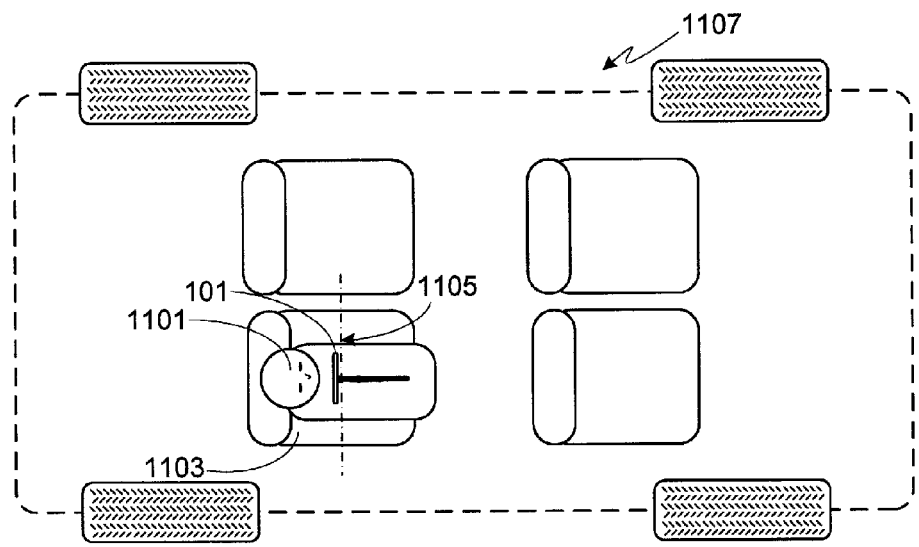
FIG. 11 schematically illustrates a deployed display configured for a user sitting in the middle of the seat.
Figure 12:
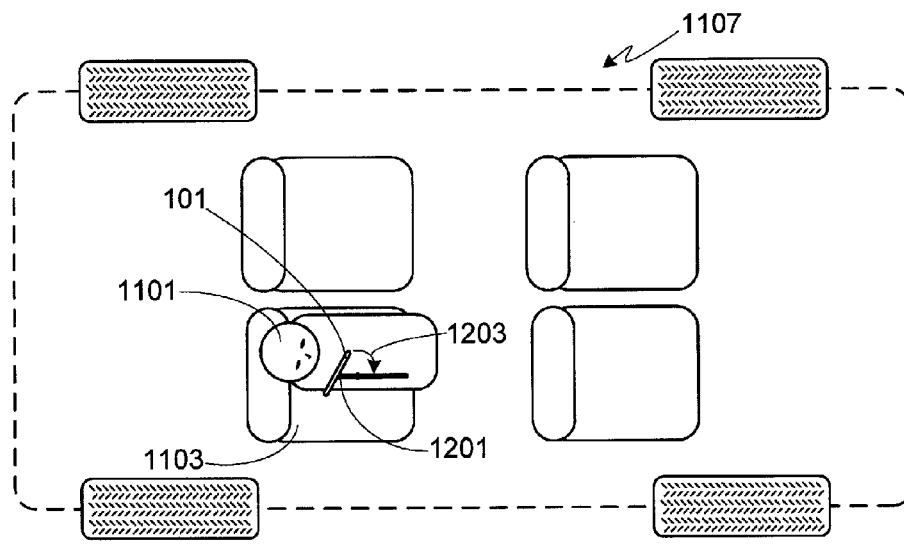
FIG. 12 schematically illustrates the display system shown in FIG. 11, automatically reconfigured to accommodate an off-center viewer.

In at least one embodiment of the invention, the system is configured to modify the display's tilt angle relative to a horizontal axis of the car, more specifically the horizontal axis running from one side of the car to the other side of the car. Preferably in this embodiment controller 805 not only automatically adjusts this tilt angle, referred to herein as the display's horizontal tilt angle, but also changes the display height and/or the vertical tilt angle as described above with respect to FIGS. 9 and 10. FIGS. 11 and 12 schematically illustrate altering the display's horizontal tilt angle as a result of the user changing seat position. As shown in FIG. 11, when user 1101 is centered within seat 1103, the front face of display 101 is parallel to, or substantially parallel to, horizontal axis 1105. If the user changes their position, for example moving towards the center of vehicle 1107 as shown in FIG. 12, controller 805 detects this shift in position using user position sensors 803 and pivots display 101 about axis 1201 in a direction 1203. As a result, user 1101 is not forced to view the display at an angle.

Figure 13:
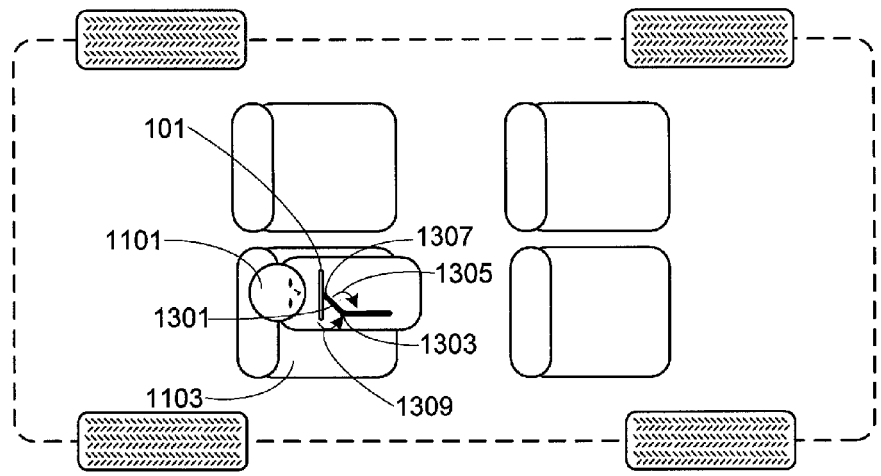
FIG. 13 schematically illustrates the display system shown in FIG. 11, automatically reconfigured to accommodate an off-center viewer while retaining a display orientation parallel to the vehicle's side-to-side horizontal axis.

It will be appreciated that the final position of display which is automatically altered by the system in response to the user's size and position will depend, at least in part, on the configuration and the capabilities of the linkage. For example, in at least one embodiment controller 805 is able to reposition display 101 in response to the user moving off-center while keeping the front panel of the display parallel to, or substantially parallel to, the horizontal axis. Preferably this approach allows display 101 to be centered in front of the user even when the user moves off-center. For example, and as shown in FIG. 13, in response to a movement by user 1101 to an off-center viewing position, controller 805 pivots arm 1301 about axis 1303 in a direction 1305, and pivots display 101 about axis 1307 in a direction 1309. The inventor envisions other linkage assemblies that can be used to either tilt, or translate display 101 sideways, in order to accommodate a user sitting off-center.

In addition to automatically altering the position of display 101 in response to the user's height or position within the vehicle's seat, the present invention may also automatically alter the display position based on the position of the vehicle seat. As a consequence, as the user adjusts their position, either by physically altering their position within the vehicle seat or by altering the position of the vehicle seat itself, the controller is able to optimize the display position.

Figure 14:
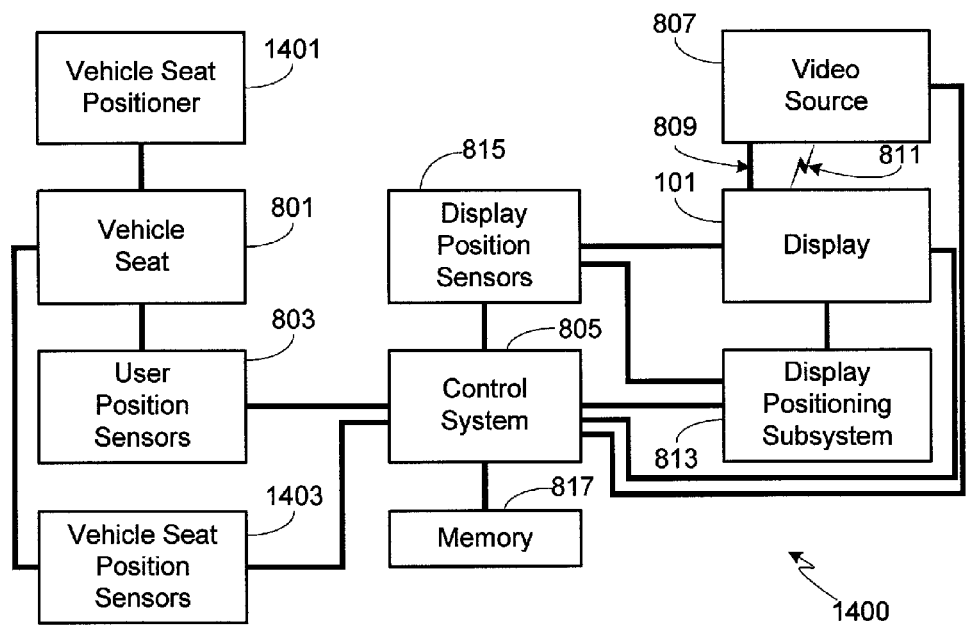
FIG. 14 illustrates a modified block diagram based on FIG. 8 in which vehicle seat position sensors have been added so that the system can automatically position the display based on seat position as well as user seating characteristics.

FIG. 14 illustrates a modification of system 800 that synchronizes display 101 with the position of the vehicle seat as well as the user's position within that seat and the size of the user. Seat 801 in system 1400 is capable of being located in any of a variety of positions through the use of mechanical or electro-mechanical means 1401. The position of the seat is monitored using one or more position sensors 1403 and that position information is provided to controller 805. As a result, embodiments utilizing system 1400 adjust the position of display 101 based on (i) the size of the user as provided by user position sensors 803, (ii) the position of the user within seat 801 as provided by user position sensors 803, and (iii) the position of seat 801 as provided by seat position sensors 1403.

Figure 15:
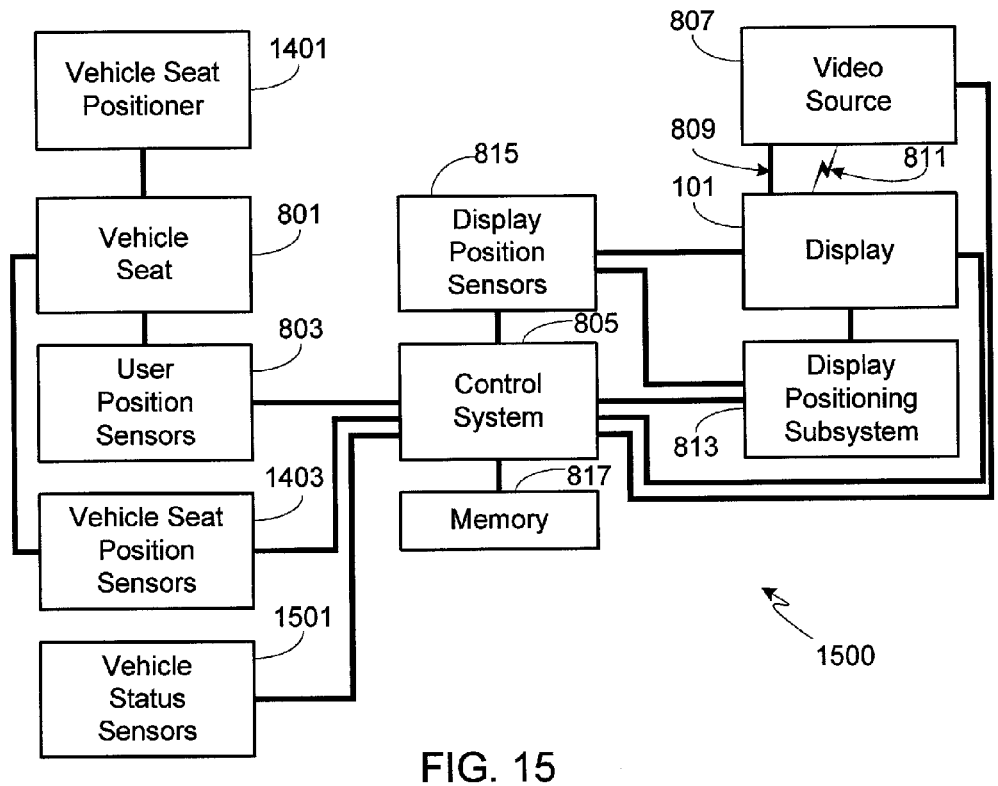
FIG. 15 illustrates a modified block diagram based on FIG. 14 in which vehicle status sensors have been added to the system.

Although not required by the invention, preferably controller 805 monitors the status of display 101 and/or video source 807, thus allowing the system to be configured to automatically deploy display 101 from a storage position when the system is activated, and then return display 101 to its storage position when it is no longer required, i.e., when the display and/or video source is deactivated. Additionally, in at least one embodiment represented by system 1500 shown in FIG. 15, controller 805 is coupled to one or more vehicle status sensors 1501 that monitor whether or not the vehicle is operating (i.e., turned on) and/or whether or not the vehicle is currently in 'drive' or in 'park'. The system can be configured to utilize this vehicle information to determine when to deploy or store display 101, for example deploying display 101 when the car is turned on or placed into drive and then storing display 101 when the car is turned off or placed into park. It should be understood that vehicle status sensors 1501 can be added to the system shown in FIG. 8 without the inclusion of vehicle seat sensors 1403.

Figure 16:
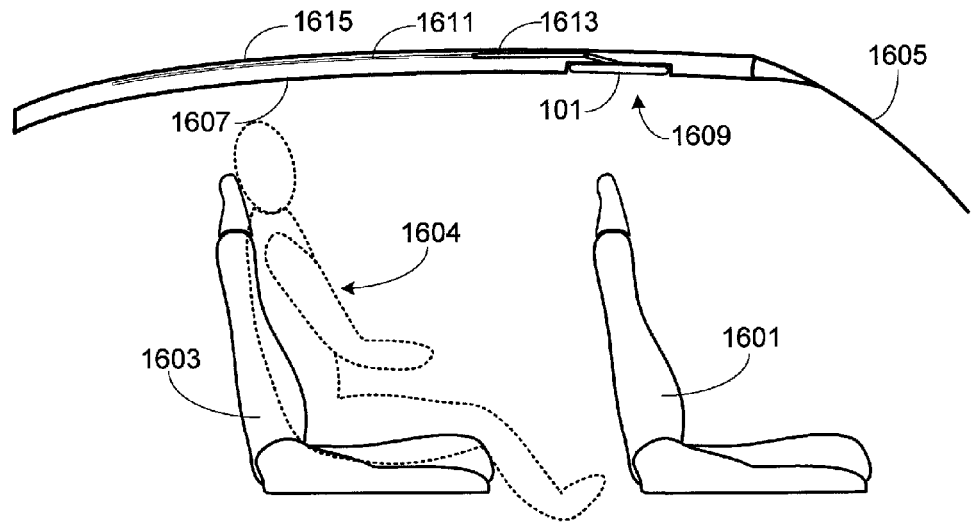
FIG. 16 provides a side view of an embodiment compatible with the invention, this view showing the display in a stored position.

As noted above, if the system includes seat position sensors 1403, then in addition to modifying the display position in response to the user's height and/or seating position, the system can also modify display position in response to the user adjusting their seat. This is demonstrated in FIGS. 16-18 using the previously illustrated linkage assembly. Visible in FIG. 16 is a front seat 1601, a rear seat 1603 with an occupant 1604, the front windshield 1605 and the vehicle's roof headliner 1607. Stored within a recess 1609 of the headliner is display 101. It should be understood that display 101 may be stored in other locations such as adjacent to the headliner but not within the headliner, adjacent to the sunroof, adjacent to the sunroof and within the sunroof pocket, in the rear deck, or elsewhere. In this embodiment display 101 is linked to a guide track 1611 via linkage arm 1613, track 1611 preferably hidden from sight by locating it between the headliner 1607 and the roof 1615. Display linkage 1613 preferably passes through a slot or slots in headliner 1607.

Figure 17:
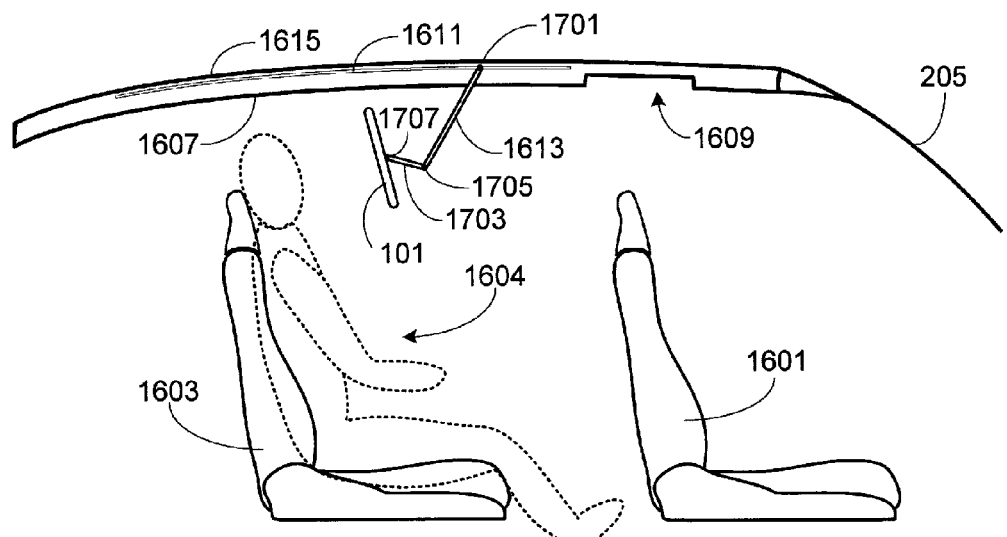
FIG. 17 provides a side view of the embodiment shown in FIG. 16 with the display deployed and positioned for use with a generally upright seat.
Figure 18:
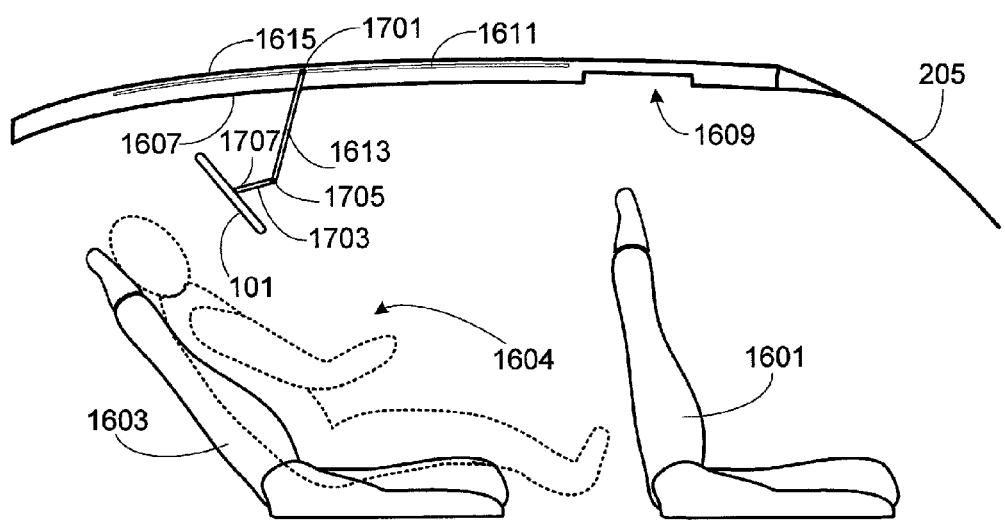
FIG. 18 provides a side view of the embodiment shown in FIGS. 16 and 17 with the display automatically re-positioned for use with a reclining seat.

Assuming the system is configured for automatic deployment upon system activation as described above, when the display system is activated control system 805 determines the vehicle seat position using seat position sensors 1403 and the size and location of the user within the vehicle seat using user position sensors 803. Controller 805 then uses display positioning subsystem 813 to deploy display 101 into a display position compatible to the current position of viewing seat 1603 and the current size and position of user 1604. If seat 1603 is in a typical upright position as shown in FIG. 17, and based on the size and position of user 1604, display 101 is automatically moved into position by rotating linkage arm 1613 about axis 1701, moving linkage arm 1613 within track 1611, rotating linkage arm 1703 about axis 1705, and rotating display 101 about axis 1707, thereby placing display 101 at the proper viewing distance and tilt angle for occupant 1604. If user 1604 alters their seating position, controller 805 adjusts the position of display 101 as described above. If user 1604 alters the position of seat 1603, for example by reclining as shown in FIG. 18, control system 805 monitors the movement of the seat using sensors 1403. Based on the new location of seat 1603, control system 805 automatically moves display 101 into position by once again rotating linkage arm 1613 about axis 1701, moving linkage arm 1613 within guide track 1611, rotating linkage arm 1703 about axis 1705, and rotating display 101 about axis 1707. Since control system 805 continually monitors occupant and seat position, if the user switches places with a user of different size, or if the user changes their position, or if the user alters the position of seat 1603, then controller 805 will again move display 101 into a position that is compatible with the new seat/user location.

In a preferred embodiment of the invention, control system 805 returns display 101 to recess 1609 (or to a different designated storage area) when the vehicle is turned off. The system can also be set-up to return the display to its storage area (e.g., recess 1609) when the car is placed in park. Preferably the user is able to over-ride the system so that display 101 can be left in the optimum viewing position for the occupant of seat 1603 even if the car is turned off or placed in park, thus allowing the occupant to continue to utilize the display system. In at least one embodiment, rather than having the system automatically return the display to its storage area, the user must command the system to return to storage, for example by de-activating display 101 or video source 807.

Figure 19:
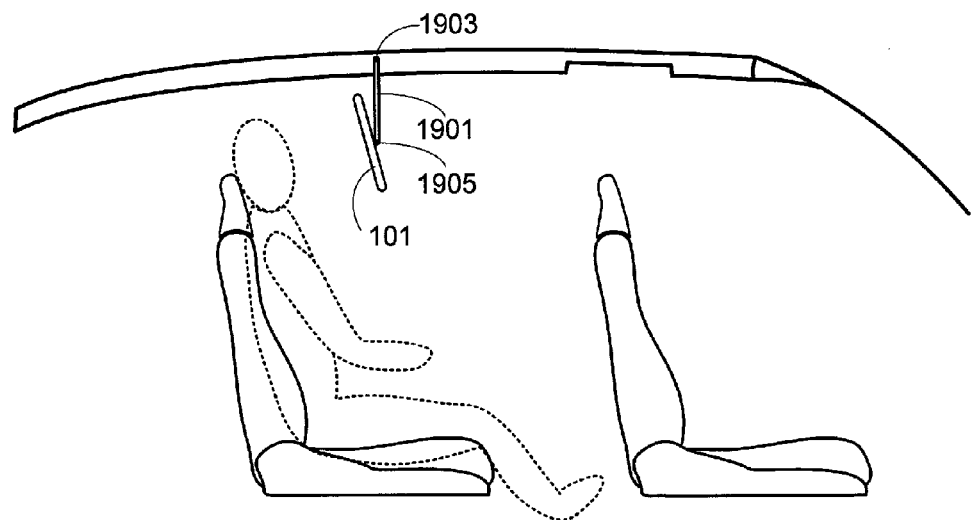
FIG. 19 illustrates a deployed display configured for a tall system user utilizing an alternate display linkage assembly.
Figure 20:
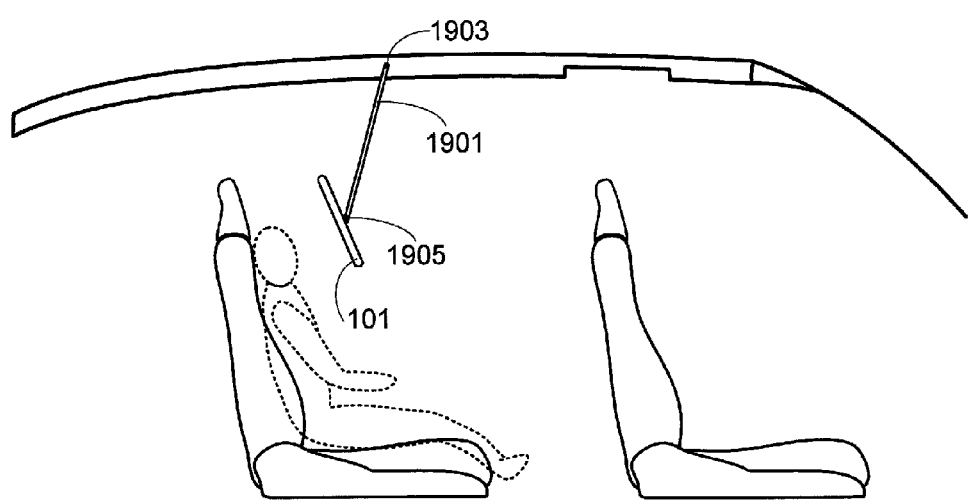
FIG. 20 illustrates the display system shown in FIG. 19, automatically reconfigured to accommodate a shorter user.
Figure 21:
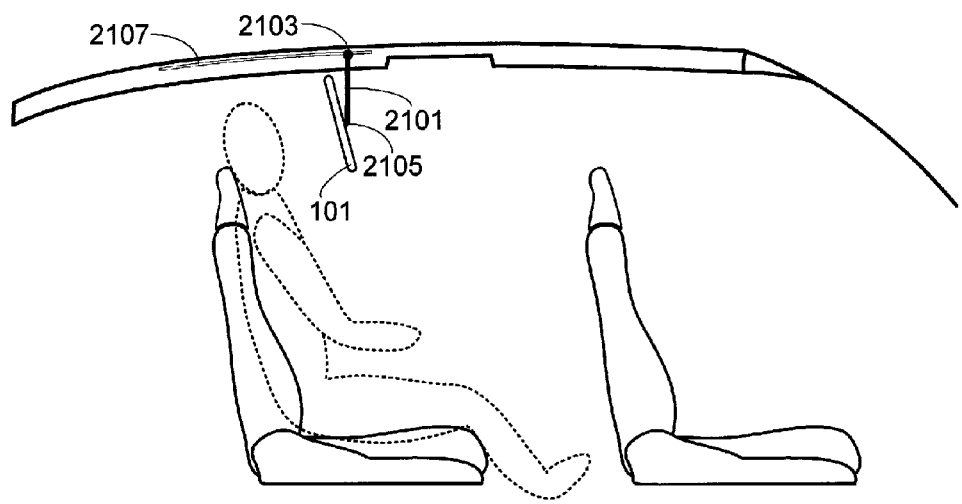
FIG. 21 illustrates a deployed display configured for a tall system user utilizing an alternate display linkage assembly.
Figure 22:
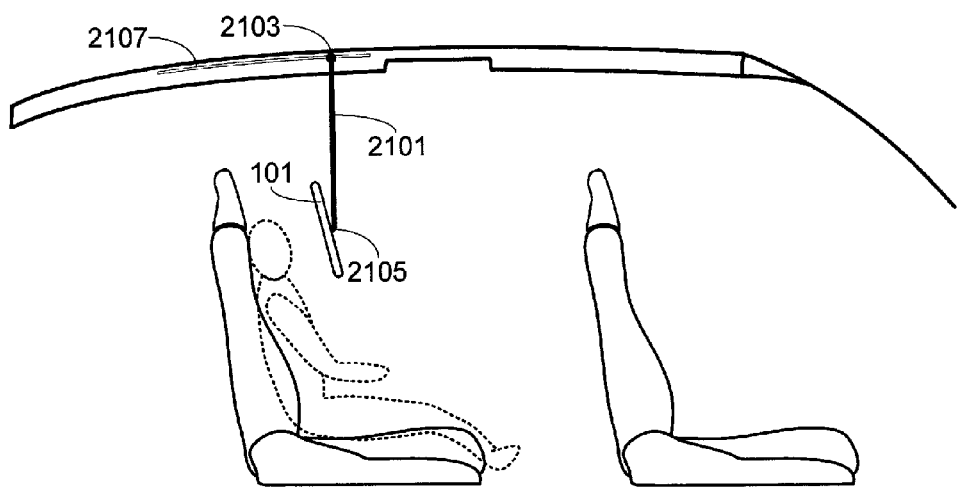
FIG. 22 illustrates the display system shown in FIG. 21, automatically reconfigured to accommodate a shorter user.

It should be understood that the multi-link display positioning system shown in FIGS. 5-7, 9-13, and 16-18 is just one possible configuration and that other positioning systems may also be used by the invention. For example, FIGS. 19 and 20 provide the same views as FIGS. 9 and 10 but illustrate an alternate positioning system that utilizes a telescoping link 1901 in order to achieve the desired viewing distance for different occupants and/or occupant positions and, in some embodiments, different seat positions. To achieve the desired range of display motion, telescoping link 1901 is controllably pivoted about pivot axes 1903 and 1905. FIGS. 21-22 illustrate yet another positioning system, this embodiment utilizing a telescoping link 2101 that controllably pivots about axes 2103 and 2105. Unlike the previous embodiment, however, link 2101 has limited range in order to achieve a greater degree of link stability. To overcome the length limitations of link 2101, link arm 2101 may be moved within guide track 2107 as required to achieve the desired display position.

It will be appreciated that while the embodiments of the display system shown in FIGS. 5-7, 9-13, and 16-22 are illustrated with a car's rear passenger seat, the display system of the invention is equally applicable to other vehicle seats (e.g., front passenger seat) as well as other types of vehicles (e.g., trains, buses, airplanes, etc.). Additionally, even though in the exemplary embodiments only a single link is visibly coupled to display 101, it should be understood that one or more links may be coupled to the display, and that the linkage assembly may be coupled to the center of the display, to one or both sides of the display, or to multiple locations on the display. To further clarify the invention, FIGS. 23-28 illustrate some exemplary coupling techniques that may be used to couple the linkage assembly to display 101. Note that the exemplary coupling techniques shown in these figures may also be used with a multi-link, multi-pivoting assembly as described above and shown in the figures.

Figure 23:
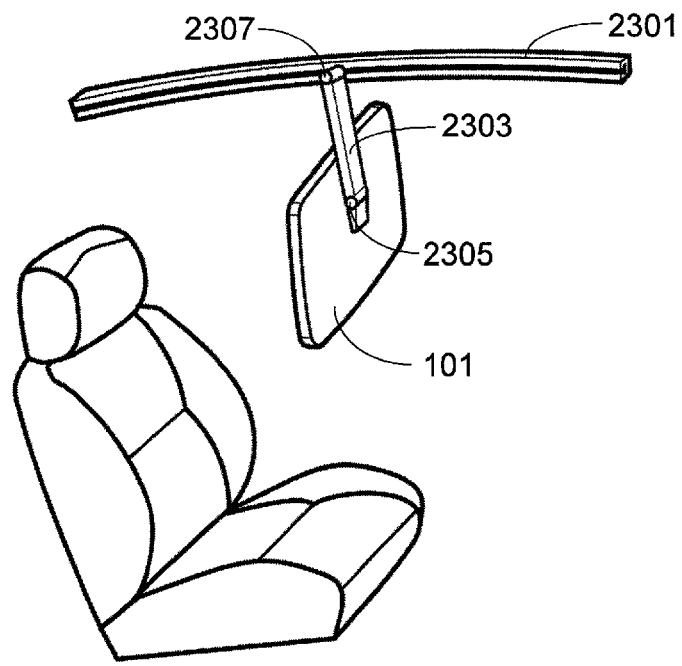
FIG. 23 provides a perspective view of a display attached to a single guide track via a single, centrally located linkage arm.

In the embodiment shown in FIG. 23, display 101 is attached to guide track 2301 via a single, centrally located arm 2303. Display 101 pivots relative to arm 2303 about hinge 2305, while arm 2303 pivots relative to guide track 2301 about hinge 2307.

Figure 24:
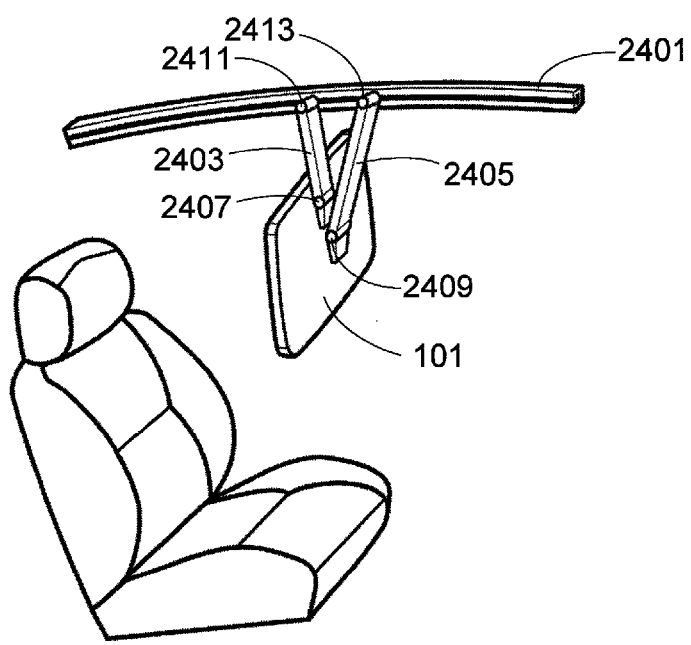
FIG. 24 provides a perspective view of a display attached to a single guide track via a pair of centrally located linkage arms.

In the embodiment shown in FIG. 24, display 101 is attached to guide track 2401 via a pair of centrally located arms 2403 and 2405. Display 101 pivots relative to arm 2403 about hinge 2407 and relative to arm 2405 about hinge 2409. Arm 2403 pivots relative to guide track 2401 about hinge 2411 while arm 2405 pivots relative to guide track 2401 about hinge 2413.

Figure 25:
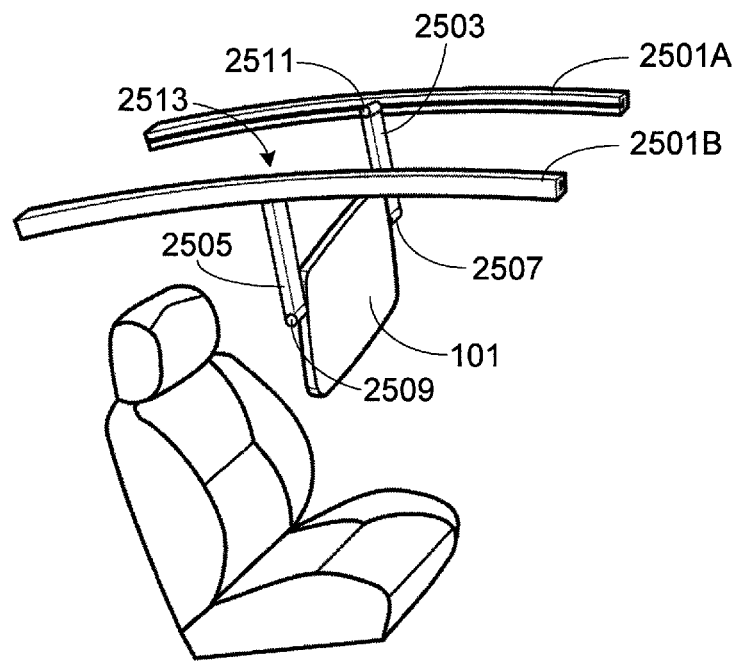
FIG. 25 provides a perspective view of a display attached to a pair of guide tracks via a pair of side mounted linkage arms.

In the embodiment shown in FIG. 25, display 101 is attached to a pair of guide tracks 2501A/2501B via a pair of side mounted arms 2503 and 2505. Display 101 pivots relative to arm 2503 about hinge 2507 and relative to arm 2505 about hinge 2509. Arm 2503 pivots relative to guide track 2501A about hinge 2511. The hinge coupling at location 2513, not visible in this view, allows arm 2505 to pivot relative to guide track 2501B.

Figure 26:
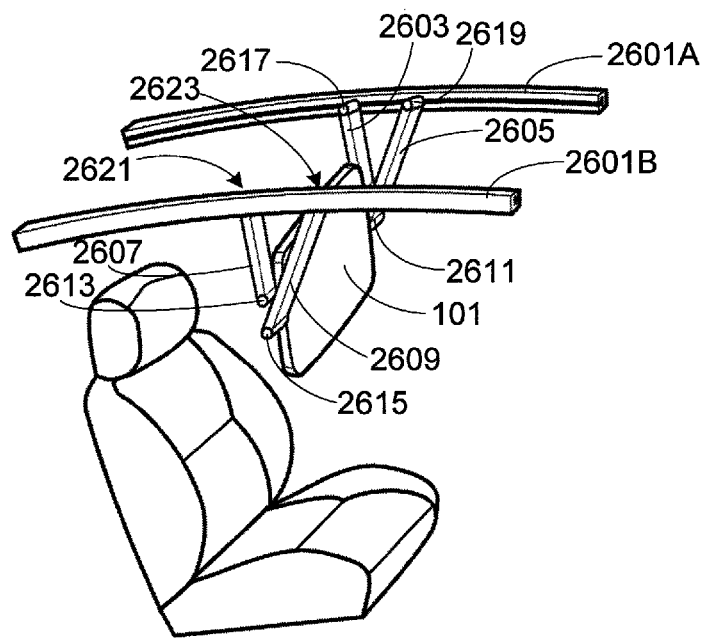
FIG. 26 provides a perspective view of a display attached to a pair of guide tracks via a first pair and a second pair of side mounted linkage arms.

In the embodiment shown in FIG. 26, display 101 is attached to a first guide track 2601A via a first pair of side mounted arms 2603 and 2605, and to a second guide track 2601B via a second pair of side mounted arms 2607 and 2609. Display 101 pivots relative to arm 2603 about a hinge not visible in this view; pivots relative to arm 2605 about hinge 2611; pivots relative to arm 2607 about hinge 2613; and pivots relative to arm 2609 about hinge 2615. Arm 2603 pivots relative to guide track 2601A about hinge 2617; arm 2605 pivots relative to guide track 2601A about hinge 2619; arm 2607 pivots relative to guide track 2601B about a hinge (not visible in this view) at location 2621; and arm 2609 pivots relative to guide track 2601B about a hinge (not visible in this view) at location 2623.

Figure 27:
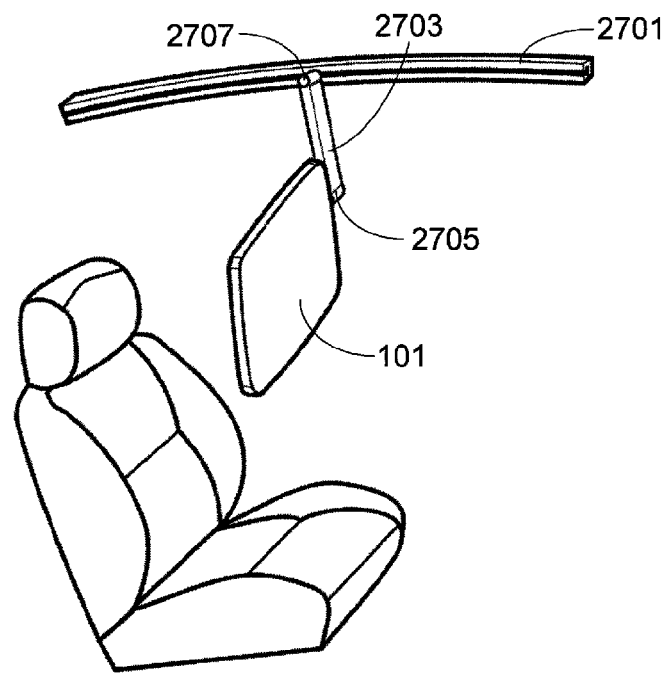
FIG. 27 provides a perspective view of a display attached to a single guide track via a single, side mounted linkage arm.

In the embodiment shown in FIG. 27, display 101 is attached to guide track 2701 via a single, side mounted arm 2703. Display 101 pivots relative to arm 2703 about hinge 2705, while arm 2703 pivots relative to guide track 2701 about hinge 2707.

Figure 28:
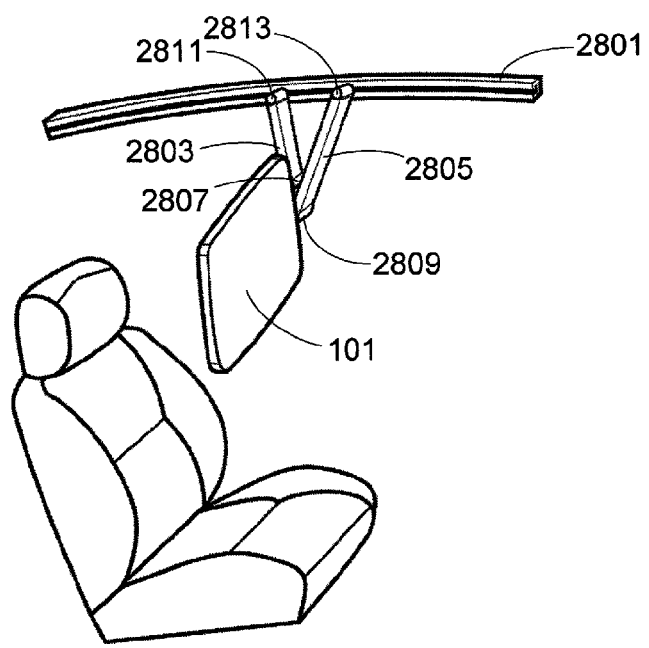
FIG. 28 provides a perspective view of a display attached to a single guide track via a pair of side mounted linkage arms.

In the embodiment shown in FIG. 28, display 101 is attached to guide track 2801 via a pair of side mounted located arms 2803 and 2805. Display 101 pivots relative to arm 2803 about hinge 2807 (partially visible in this view) and relative to arm 2805 about hinge 2809 (partially visible in this view). Arm 2803 pivots relative to guide track 2801 about hinge 2811 while arm 2805 pivots relative to guide track 2801 about hinge 2813.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A display system, comprising:
    a display mounted within and to a vehicle, wherein said display is adjustable within a range of display positions;
    a display positioning system coupled to said display;
    a vehicle seat mounted within said vehicle, wherein said vehicle seat is positioned within said vehicle to allow an occupant of said vehicle seat to utilize said display;
    an occupant position sensor system, wherein said occupant position sensor system outputs occupant position data corresponding to a current position of said occupant within said vehicle seat;
    a control system coupled to said display positioning system and to said occupant position sensor system, wherein said control system monitors said occupant position data and automatically adjusts said display with said display positioning system to a current display position within said range of display positions in response to said current position of said occupant within said vehicle seat;
    a linkage assembly controllable by said display positioning system, wherein said display is mounted to said vehicle with said linkage assembly, said linkage assembly further comprising a guide track mounted to said vehicle, wherein an arm of said linkage assembly slides within said guide track, wherein a position of said arm within said guide track is controlled by said display positioning system, and wherein said display positioning system and said control system utilizes said guide track and said arm of said linkage assembly to adjust said display to said current display position.

2. The display system of claim 1, further comprising a memory coupled to said control system, wherein stored within said memory is a look-up table providing a plurality of compatible display positions that correspond to a plurality of occupant positions within said vehicle seat, wherein said control system utilizes said look-up table to select said current display position from said plurality of compatible display positions based on said current position of said occupant within said vehicle seat.

3. The display system of claim 2, wherein each of said plurality of compatible display positions maintains a display viewing distance within a preset range.

4. The display system of claim 2, wherein each of said plurality of compatible display positions maintains a display vertical tilt angle relative to said occupant within a preset range.

5. The display system of claim 2, wherein each of said plurality of compatible display positions maintains a display horizontal tilt angle relative to said occupant within a preset range.

6. The display system of claim 2, wherein each of said plurality of compatible display positions maintains a display horizontal tilt angle relative to a horizontal vehicle axis within a preset range.

7. The display system of claim 1, wherein said occupant position sensor system is comprised of a plurality of pressure sensors integrated into said vehicle seat.

8. The display system of claim 1, wherein said occupant position sensor system is comprised of at least one transducer.

9. The display system of claim 8, wherein said at least one transducer is comprised of at least one electromagnetic transducer.

10. The display system of claim 8, wherein said at least one transducer is comprised of at least one ultrasonic transducer.

11. The display system of claim 8, wherein said at least one transducer is mounted to said display.

12. The display system of claim 1, said display positioning system further comprising an electro-mechanical positioning system.

13. The display system of claim 1, said display positioning system further comprising a hydraulic positioning system.

14. The display system of claim 1, further comprising a vehicle seat position sensor coupled to said control system, wherein said vehicle seat position sensor outputs seat position data corresponding to a current seat position of said vehicle seat, and wherein said control system monitors said seat position data and automatically adjusts said current display position in response to a change in said current seat position.

15. The display system of claim 14, further comprising a memory coupled to said control system, wherein stored within said memory is a look-up table providing a plurality of compatible display positions that correspond to a plurality of occupant positions within said vehicle seat and to a range of seat positions for said vehicle seat, wherein said control system utilizes said look-up table to select said current display position from said plurality of compatible display positions based on said current position of said occupant within said vehicle seat and said current seat position.

16. A display system, comprising:
a display mounted within and to a vehicle, wherein said display is adjustable within a range of display positions;
a display positioning system coupled to said display;
a vehicle seat mounted within said vehicle, wherein said vehicle seat is positioned within said vehicle to allow an occupant of said vehicle seat to utilize said display;
an occupant position sensor system, wherein said occupant position sensor system outputs occupant position data corresponding to a current position of said occupant within said vehicle seat;
a control system coupled to said display positioning system and to said occupant position sensor system, wherein said control system monitors said occupant position data and automatically adjusts said display with said display positioning system to a current display position within said range of display positions in response to said current position of said occupant within said vehicle seat;
a linkage assembly controllable by said display positioning system, wherein said display is mounted to said vehicle with said linkage assembly, said linkage assembly further comprising a telescoping link, wherein a link length corresponding to said telescoping link is controlled by said display positioning system, said linkage assembly further comprising a guide track mounted to said vehicle, wherein said telescoping link of said linkage assembly slides within said guide track, wherein a position of said telescoping link within said guide track is controlled by said display positioning system, and wherein said display positioning system and said control system utilizes said guide track and said telescoping link of said linkage assembly to adjust said display to said current display position.

17. The display system of claim 16, further comprising a memory coupled to said control system, wherein stored within said memory is a look-up table providing a plurality of compatible display positions that correspond to a plurality of occupant positions within said vehicle seat, wherein said control system utilizes said look-up table to select said current display position from said plurality of compatible display positions based on said current position of said occupant within said vehicle seat.

18. The display system of claim 17, wherein each of said plurality of compatible display positions maintains a display viewing distance within a preset range.

19. The display system of claim 17, wherein each of said plurality of compatible display positions maintains a display vertical tilt angle relative to said occupant within a preset range.

20. The display system of claim 17, wherein each of said plurality of compatible display positions maintains a display horizontal tilt angle relative to said occupant within a preset range.

21. The display system of claim 17, wherein each of said plurality of compatible display positions maintains a display horizontal tilt angle relative to a horizontal vehicle axis within a preset range.

22. The display system of claim 16, wherein said occupant position sensor system is comprised of a plurality of pressure sensors integrated into said vehicle seat.

23. The display system of claim 16, wherein said occupant position sensor system is comprised of at least one transducer.

24. The display system of claim 23, wherein said at least one transducer is comprised of at least one electromagnetic transducer.

25. The display system of claim 23, wherein said at least one transducer is comprised of at least one ultrasonic transducer.

26. The display system of claim 23, wherein said at least one transducer is mounted to said display.

27. The display system of claim 16, said display positioning system further comprising an electro-mechanical positioning system.

28. The display system of claim 16, said display positioning system further comprising a hydraulic positioning system.

29. The display system of claim 16, further comprising a vehicle seat position sensor coupled to said control system, wherein said vehicle seat position sensor outputs seat position data corresponding to a current seat position of said vehicle seat, and wherein said control system monitors said seat position data and automatically adjusts said current display position in response to a change in said current seat position.

30. The display system of claim 29, further comprising a memory coupled to said control system, wherein stored within said memory is a look-up table providing a plurality of compatible display positions that correspond to a plurality of occupant positions within said vehicle seat and to a range of seat positions for said vehicle seat, wherein said control system utilizes said look-up table to select said current display position from said plurality of compatible display positions based on said current position of said occupant within said vehicle seat and said current seat position.

31. A display system, comprising:
a display mounted within and to a vehicle, wherein said display is adjustable within a range of display positions;
a display positioning system coupled to said display;
a vehicle seat mounted within said vehicle, wherein said vehicle seat is positioned within said vehicle to allow an occupant of said vehicle seat to utilize said display;

an occupant position sensor system, wherein said occupant position sensor system outputs occupant position data corresponding to a current position of said occupant within said vehicle seat;

a control system coupled to said display positioning system and to said occupant position sensor system, wherein said control system monitors said occupant position data and automatically adjusts said display with said display positioning system to a current display position within said range of display positions in response to said current position of said occupant within said vehicle seat;

a linkage assembly controllable by said display positioning system, wherein said display is mounted to said vehicle with said linkage assembly, said linkage assembly further comprising a first link and a second link, wherein a first end portion of said first link is pivotably coupled to said display, wherein a first end portion of said second link is pivotably coupled to a second end portion of said first link, and wherein a second end portion of said second link is pivotably coupled to said vehicle, said linkage assembly further comprising a guide track mounted to said vehicle, wherein said second end portion of said second link slides within said guide track, and wherein a position of said second end portion of said second link within said guide track is controlled by said display positioning system, and wherein said display positioning system and said control system utilizes said linkage assembly to adjust said display to said current display position.

32. The display system of claim 31, further comprising a memory coupled to said control system, wherein stored within said memory is a look-up table providing a plurality of compatible display positions that correspond to a plurality of occupant positions within said vehicle seat, wherein said control system utilizes said look-up table to select said current display position from said plurality of compatible display positions based on said current position of said occupant within said vehicle seat.

33. The display system of claim 32, wherein each of said plurality of compatible display positions maintains a display viewing distance within a preset range.

34. The display system of claim 32, wherein each of said plurality of compatible display positions maintains a display vertical tilt angle relative to said occupant within a preset range.

35. The display system of claim 32, wherein each of said plurality of compatible display positions maintains a display horizontal tilt angle relative to said occupant within a preset range.

36. The display system of claim 32, wherein each of said plurality of compatible display positions maintains a display horizontal tilt angle relative to a horizontal vehicle axis within a preset range.

37. The display system of claim 31, wherein said occupant position sensor system is comprised of a plurality of pressure sensors integrated into said vehicle seat.

38. The display system of claim 31, wherein said occupant position sensor system is comprised of at least one transducer.

39. The display system of claim 38, wherein said at least one transducer is comprised of at least one electromagnetic transducer.

40. The display system of claim 38, wherein said at least one transducer is comprised of at least one ultrasonic transducer.

41. The display system of claim 38, wherein said at least one transducer is mounted to said display.

42. The display system of claim 31, said display positioning system further comprising an electro-mechanical positioning system.

43. The display system of claim 31, said display positioning system further comprising a hydraulic positioning system.

44. The display system of claim 31, further comprising a vehicle seat position sensor coupled to said control system, wherein said vehicle seat position sensor outputs seat position data corresponding to a current seat position of said vehicle seat, and wherein said control system monitors said seat position data and automatically adjusts said current display position in response to a change in said current seat position.

45. The display system of claim 44, further comprising a memory coupled to said control system, wherein stored within said memory is a look-up table providing a plurality of compatible display positions that correspond to a plurality of occupant positions within said vehicle seat and to a range of seat positions for said vehicle seat, wherein said control system utilizes said look-up table to select said current display position from said plurality of compatible display positions based on said current position of said occupant within said vehicle seat and said current seat position.

* * * * *